United States Patent
Tye et al.

(10) Patent No.: US 8,520,382 B2
(45) Date of Patent: Aug. 27, 2013

(54) ELECTRONIC DEVICE WITH DEPLOYABLE AIR FLOW ENHANCING SUPPORT

(75) Inventors: Trentent Tye, Calgary (CA); Troy Tye, St. Albert (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 12/996,769

(22) Filed: Dec. 7, 2010

(65) Prior Publication Data

US 2011/0075352 A1 Mar. 31, 2011

(51) Int. Cl.
*H05K 7/20* (2006.01)

(52) U.S. Cl.
USPC ...... 361/694; 361/679.46; 361/690; 248/685; 248/688

(58) Field of Classification Search
USPC .. 361/679.2–679.21, 679.27, 679.46–679.49, 361/679.51, 679.57–679.58, 688–690, 694–696, 361/726–727, 752
See application file for complete search history.

(56) References Cited

U.S. PATENT DOCUMENTS

| 4,589,659 | A | * | 5/1986 | Yokoi et al. | 463/34 |
| 5,251,102 | A | * | 10/1993 | Kimble | 361/679.09 |
| 5,552,960 | A | * | 9/1996 | Nelson et al. | 361/679.54 |
| 5,871,094 | A | * | 2/1999 | Leibowitz | 206/320 |
| 6,154,359 | A | * | 11/2000 | Kamikakai et al. | 361/679.27 |
| 6,181,554 | B1 | * | 1/2001 | Cipolla et al. | 361/679.46 |
| 6,256,193 | B1 | * | 7/2001 | Janik et al. | 361/679.59 |
| 6,305,652 | B1 | | 10/2001 | Borke et al. | |
| 6,459,573 | B1 | * | 10/2002 | DiStefano et al. | 361/679.46 |
| 6,460,221 | B1 | * | 10/2002 | Eromaki | 16/286 |
| 6,496,369 | B2 | * | 12/2002 | Nakamura | 361/697 |
| 6,612,668 | B2 | * | 9/2003 | Doan | 312/223.2 |
| 6,930,881 | B2 | * | 8/2005 | Karidis et al. | 361/679.55 |
| 2002/0012228 | A1 | * | 1/2002 | Ozaki et al. | 361/687 |

FOREIGN PATENT DOCUMENTS

KR 10-2006-0103707 10/2006

OTHER PUBLICATIONS

The internetionai Search Report and Written Opinion of the International Searching Authority for interntional Application No. PCT/US2008/066674 dated Feb. 25, 2009, pages 11.

* cited by examiner

*Primary Examiner* — Courtney Smith

(57) ABSTRACT

An electronic device includes a body portion such as, for example, a laptop chassis, and a deployable support coupled to the bottom surface of the body portion. The deployable support can be moved between a stowed position relative the bottom surface of the body portion and a deployed position in which support is positioned in spaced relationship to the bottom to create an airflow path beneath the body portion.

16 Claims, 4 Drawing Sheets

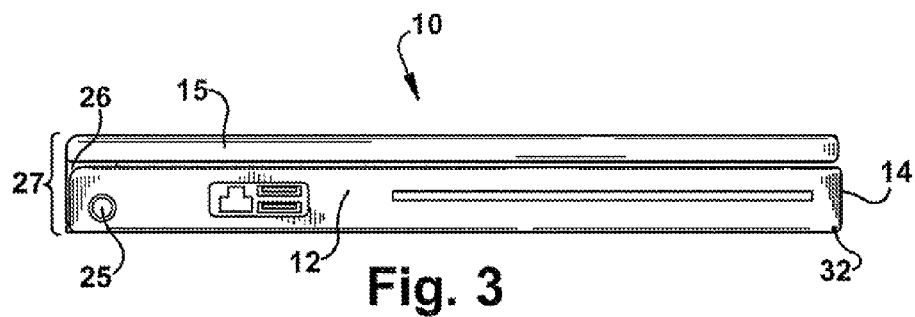
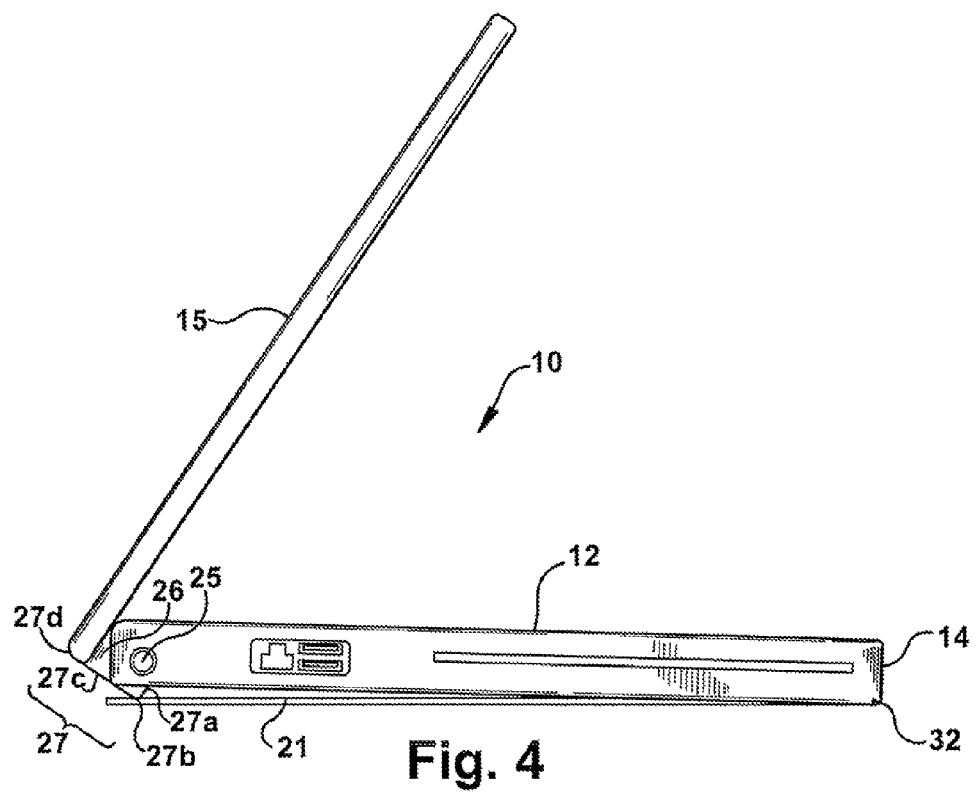

ELECTRONIC DEVICE WITH DEPLOYABLE AIR FLOW ENHANCING SUPPORT

BACKGROUND

Many electronic devices, such as, for example, laptop computers, include an air intake or a cooling surface situated on the bottom surface of the device. Since the device is normally resting on its bottom surface when it is in use, measures have been taken to create an air flow space between the bottom of the device and the surface on which it rests. For example, some laptop computers include rubber feet on which the laptop rests. When the laptop computer is placed on a hard, even surface the feet create a path for cooling air to flow between the laptop computer and the surface.

SUMMARY

An electronic device includes a body portion, such as, for example, a laptop chassis, and a deployable support coupled to the bottom surface of the body portion. The deployable support can be moved between a stowed position relative the bottom surface of the body portion and a deployed position in which support is positioned in spaced relationship to the bottom to create an airflow path beneath the body portion.

The electronic device may also include a cover portion, such as, for example, a laptop monitor panel. The cover portion can be connected to the body portion and moveable between a closed position in which an inner surface of the cover overlays a top surface of the body portion and an open position in which the cover is separated from the top surface of the body portion. The deployable support may deployed when the cover is moved to the open position. This deployment may be automatically caused by the opening of the cover portion.

BRIEF DESCRIPTION OF THE DRAWINGS

FIG. 3 is a side view of the exemplary electronic device of FIG. 1 with a cover portion in a closed position;

FIG. 4 is a side view of the exemplary electronic device of FIG. 1 with the cover portion in a partially open position.

DESCRIPTION

Electronic devices that rely on cooling surfaces or air intakes situated on a bottom surface of the device may experience a reduction in cooling efficiency when the device is placed on a soft or uneven surface such as, for example, a users lap. Such surfaces have a tendency to obstruct air flow around the bottom surface of the device. Many cooling-enhancing features such as rubber feet on the bottom surface of the laptop's chassis are defeated by a soft surface that simply envelops the cooling-enhancing feature and obstructs the air flow around the bottom surface of the device. In addition, when the device is placed on a users lap heat may build up due to less than optimal air flow causing discomfort to the user.

A deployable support that provides sufficient contact area to create and maintain clearance beneath the bottom surface of the device when the device is placed on a soft surface improves the cooling efficiency of the device. The electronic device rests upon the support surface created by the deployable support thereby improving airflow by freeing the air intakes of blockage that would be caused by the enveloping tendency of soft surfaces. As in the embodiment described below, the deployable support may be deployed automatically by movement of the cover of the device to the open position.

Figure 1:
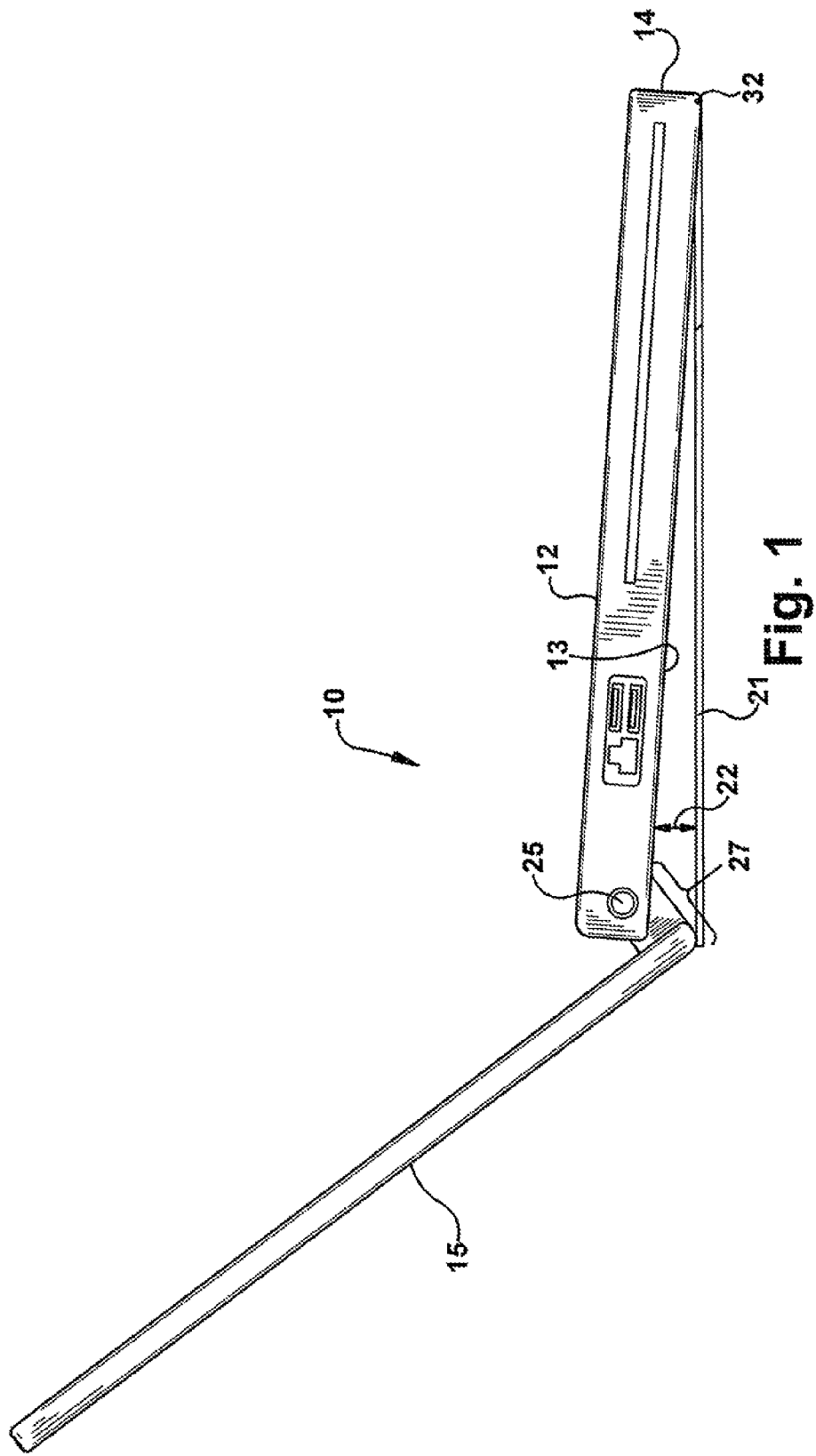
FIG. 1 is a side view of an exemplary electronic device that includes a deployable support constructed in accordance with an embodiment of the present invention.
Figure 2:
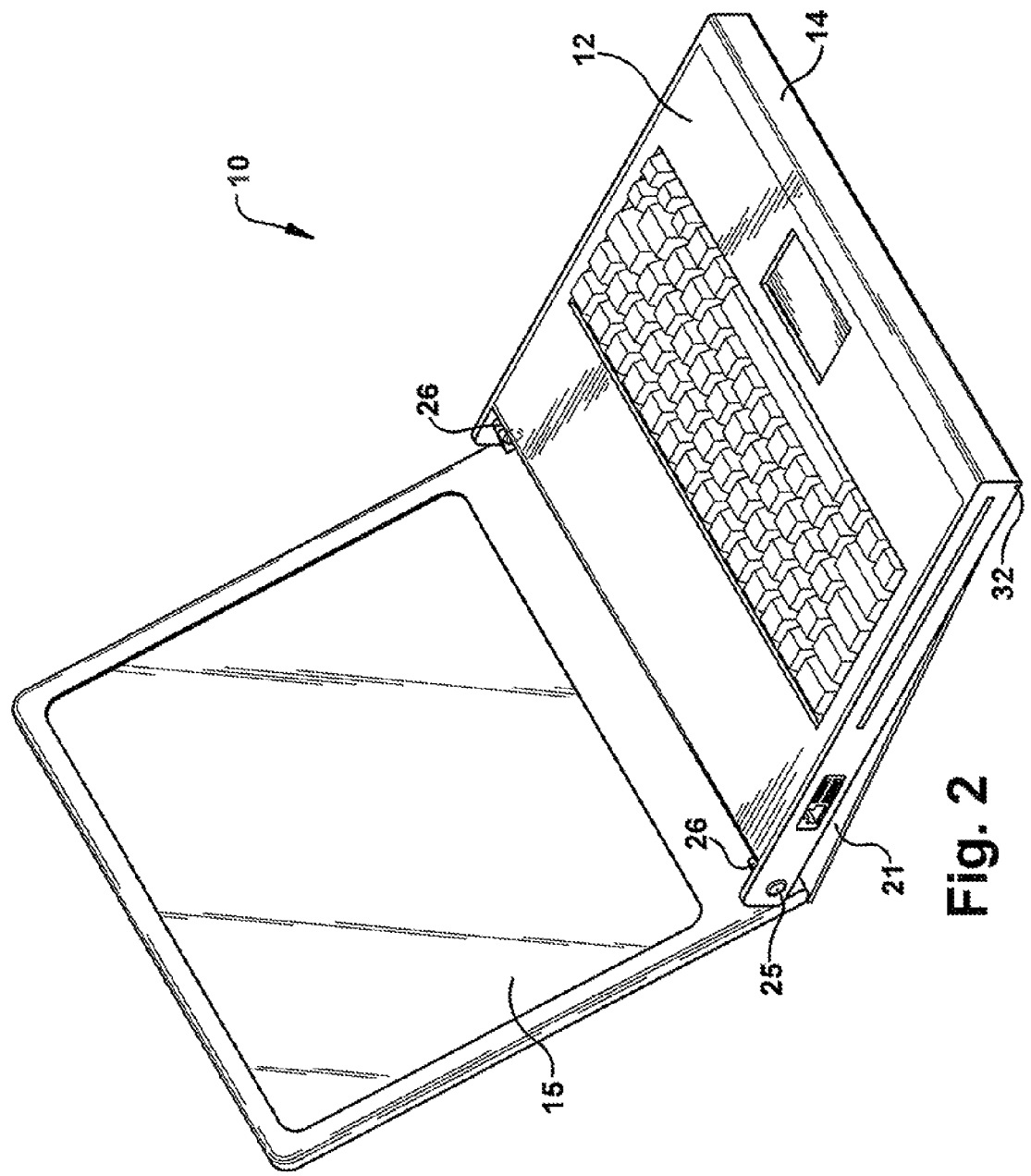
FIG. 2 is a perspective view of the exemplary electronic device of FIG. 1.

Referring now to the figures, FIG. 1 illustrates an exemplary electronic device, a laptop computer 10, that includes a deployable support 21. The laptop computer includes a body portion 12 (e.g., a chassis) and a cover portion 15 (e.g., a monitor panel.) As shown in FIG. 2, the deployable support 21 is deployed by a deployment mechanism 26 such as, for example, a lift arm 26 or similar structure. When the deployable support 21 is deployed, a clearance space through which cooling air may flow, indicated generally as 22, is created between a bottom surface 13 of the laptop and the deployable support 21.

The deployable support 21 is depicted as a solid planar component in this embodiment. Nevertheless, the deployable support 21 could be implemented in any configuration that provides sufficient contact area to create a secondary support surface for the laptop. Sufficient contact area for deployable support 21 includes, but is not limited to, a contact surface area shaped to the outer dimensions of the bottom surface 13. In such an embodiment, the contact area need not exactly mirror the outer dimensions of the bottom surface 12, but only approximate. Sufficient contact area also includes deployable support 21 being shaped to dimensions less (e.g., half, third, quarter, etc) than the outer dimensions of the bottom surface 13. Also, the deployable support could be implemented in other embodiments with a screen or lattice instead of a solid planar component. The deployable support 21 may include ergonomic features such as molded indentations configured to match the contour of a user's legs, channels or grooves to increase the size or volume of the clearance space, and opening or apertures to reduce weight. The deployable support may be composed of a plurality of panels or members. The deployable support may also include access openings or through-connections for docking stations so that the laptop may be docked with the support deployed.

The deployable support 21 is pivotally connected to a bottom edge or portion of a front face 14 of the laptop with, for example a hinge 32. Other connecting structures may be used including hinge-type structures. The deployable support may also be hinged or connected to a portion of the bottom surface 13. The hinge 32 may include a biasing feature such as a spring (not shown) that urges the support 21 toward the bottom surface 13. Other biasing features may also be used including resilient members made of rubber, polymers or plastics. This biasing feature maintains the deployable support 21 in the stowed position (shown in FIG. 3) when the laptop's monitor 15 is closed.

To deploy the deployable support 21, the lift arm 26 is coupled between the chassis 12 and the deployable support 21. The lift arm 26 is pivotally connected at a first end to the chassis 12 at a pivot point 25. The lift arm 26 is fixed at a second end to the monitor panel 15 thus forming, in one embodiment, an angled connection between the monitor panel 15 and the chassis 12. In the described embodiment, the lift arm 26 serves as one type of hinge mechanism between the monitor panel 15 and chassis 12. However, in other embodiments the deployment mechanism may operate independently of the cover and there may be a separate hinge connection between the monitor panel 15 and chassis 12. One embodiment of the lift arm 26 may be seen in more detail in FIG. 2.

Referring now to FIG. 3, the laptop 10 is shown with the monitor panel 15 closed. This figure generally shows a stowed position for the deployable support 21. The lift arm 26 is configured to create a lift surface 27 that includes a bottom edge of the monitor panel. When the monitor panel is closed, the lift arm 26 is positioned in toward the chassis 12 to reduce the impact of the lift arm 26 on the outer physical envelope of the laptop. FIG. 4 shows the laptop 10 with the monitor panel 15 being moved toward an open position. The lift surface 27 be seen, including a front edge 27a on which the deployable support 21 rests when the monitor panel is closed. The lift surface also includes a front corner 27b that contacts or cams against the deployable support 21 when the monitor panel 15 is first moved away from its closed position.

Figure 5A:
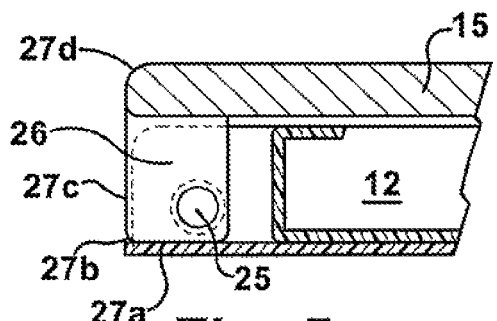
FIGS. 5a-5d are fragmentary cross-section views of the exemplary electronic device of FIG. 1 with the cover portion in various positions between the closed and open position.
Figure 5B:
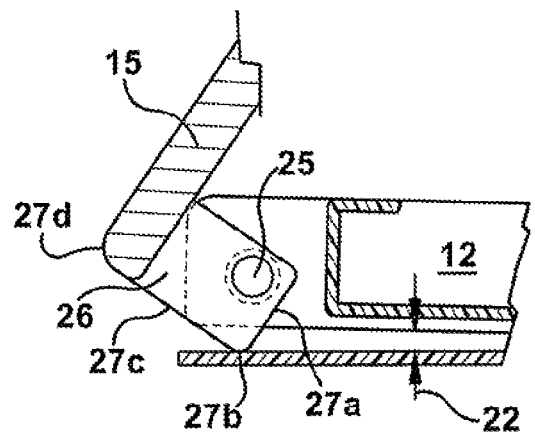
Figure 5C:
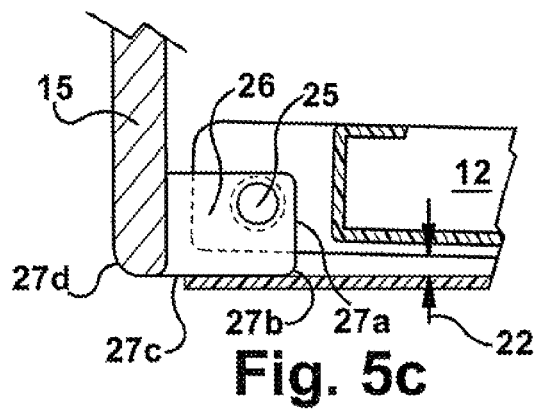
Figure 5D:
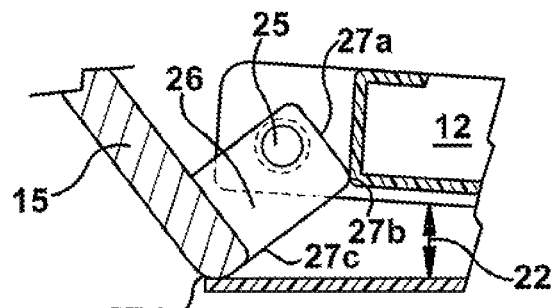

Referring now to FIGS. 5a-5d, a succession of partial cross-section views illustrate the action of the lift surface 27 on the deployable support 21 as the cover is moved from the closed or stowed position in FIG. 5a to the open position in FIG. 5d. As already discussed in connection with FIG. 3 and as shown in FIG. 5a, when the monitor panel 15 is closed the deployable support 21 is urged by the biasing hinge 32 (FIG. 3) to rest against front edge surface 27a. In FIG. 5b, the monitor panel 15 is moved toward the open position and the front corner 27b contacts the deployable support 21 and moves the support away from the chassis 12.

In FIG. 5c the monitor panel 15 is at approximately a right angle to the chassis 12. In this position a bottom surface 27c of the lift arm rests against the deployable support 21. The width of the lift arm 26 is such that the bottom surface 27c projects below the bottom surface 13 of the chassis 12 to create clearance between the deployable support 21 and the chassis 12 when the monitor panel 15 is in this position. Because in normal operation, the monitor panel is positioned at an angle greater than 90 degrees with respect to the chassis 12, it may not be necessary to create clearance in this position and the bottom surface 27d may be coincident with a plane of the bottom surface 13 in the position shown in FIG. 5c.

FIG. 5d shows the monitor panel 15 in a typical operating or open position. With the monitor panel in this position the deployable support 21 rests against a rear corner 27d of the lift surface. The rear corner 27d may include a surface on the bottom of the monitor panel 15 as shown in FIG. 5d, or a surface on the lift arm 26, or both. As can be seen from FIGS. 5a-5d, the lift surface 27 creates clearance 22 when the monitor panel 15 is moved away from the chassis 12 to provide an air flow path beneath the chassis.

In other embodiments, the lift surface may have a different geometric configurations, including a curved or continuously varying lift surface. In general, any deployable support being sized and configured to reduce the obstruction of air flow by a soft surface on which the electronic device is placed may be used. In addition, the deployment mechanism may be manually actuable by a user or automatically actuated by operation of another electronic device component.

As can be seen from the foregoing description, the use of a deployable support that provides sufficient contact area to create and maintain clearance beneath the bottom surface of an electronic device when the device is placed on a soft surface improves the cooling efficiency of the device. While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, various types of deployment mechanisms to deploy the support can be used. Therefore, the invention, in its broader aspects, is not limited to the specific details, the representative apparatus, and illustrative examples shown and described. Accordingly, departures may be made from such details without departing from the spirit or scope of the applicants general inventive concept.

What is claimed:

1. An electronic device comprising:
a body portion;
a cover portion pivotally connected to the body portion and moveable between a closed position and an open position;
a support coupled to a bottom surface of the body portion, wherein the support is moveable between a stowed position and a deployed position in which the support is positioned in spaced relationship to the bottom surface to create an airflow path beneath the body portion; and
a lift aim pivotally coupled to the body and fixed in position relative to the cover and is oriented perpendicular to an inner surface of the cover, wherein the lift arm comprises a cam surface to move the support to the deployed position in response to movement of the cover to the open position.

2. The electronic device of claim 1 wherein the body portion comprises a support hinge disposed proximate a front edge of a bottom surface, the support hinge pivotally connecting the support to the body portion and wherein the support is to pivot away from the bottom surface on the support hinge.

3. The electronic device of claim 2 wherein the support hinge comprises a biasing mechanism that urges the support toward the bottom surface.

4. The electronic device of claim 1 wherein the support has a substantially planar configuration and a surface area equal to or less than a surface area of the bottom surface of the body.

5. The electronic device of claim 1 wherein the electronic device comprises a laptop computer and wherein the body comprises a CPU portion of the laptop computer and the cover comprises a monitor portion of the laptop computer.

6. An electronic device comprising:
a body portion;
a cover portion pivotally connected to the body portion and moveable between a closed position in which an inner surface of the cover overlays a top surface of the body portion and an open position in which the cover is separated from the top surface of the body portion;
a support coupled to a bottom surface of the body portion, the support being moveable between a stowed position in which the support closes against the bottom surface of the body portion and an open position in which the support is positioned in spaced relationship to the bottom surface to create an airflow path beneath the body portion when the cover portion is in the open position; and
a support deployment mechanism comprising a lift arm that is pivotally connected at a first distal end to a bottom edge of the cover such that the lift arm is fixed in position relative to the cover and is oriented perpendicular to the inner surface of the cover; and
wherein the lift arm comprises a camming surface to project below the body when the cover pivots relative to the body to move the support to the deployed position.

7. The device of claim 6 further comprising a pivoting connection coupling the support to the bottom surface of the body portion.

8. The device of claim 7 wherein the pivoting connection further comprises a connection to the cover portion.

9. An electronic device comprising:
a body;
a support surface hinged to the body, the support surface moveable between a stowed state and a deployed state, wherein the support surface is positioned away from the body in the deployed state to generate an air flow space between the body and the support surface that extends substantially across an entire bottom surface of the body;
a hinge connecting the support surface to the body; and
a lift mechanism comprising a pivot joint and an arm, the pivot joint connecting the lift mechanism to the body, and the arm comprising at least on camming portion that is to rotate about the pivot joint to move the support surface from the stowed state to the deployed state.

10. The electronic device of claim 9 wherein the lift mechanism further comprises a display.

11. The electronic device of claim 9 wherein the hinge comprises a pivotable connection to a bottom portion of the body.

12. The electronic device of claim 9 wherein the hinge comprises a pivotable connection to a forward portion of the body.

13. The electronic device of claim 9 wherein the air flow space comprises a wedge-shaped volume.

14. The electronic device of claim 9 wherein the hinge comprises a biasing member.

15. The electronic device of claim 9 wherein the lift mechanism comprises a second camming portion.

16. The electronic device of claim 9 wherein the support surface comprises at least one planar portion.

* * * * *

UNITED STATES PATENT AND TRADEMARK OFFICE
CERTIFICATE OF CORRECTION

PATENT NO. : 8,520,382 B2  Page 1 of 1
APPLICATION NO. : 12/996769
DATED : August 27, 2013
INVENTOR(S) : Trentent Tye et al.

It is certified that error appears in the above-identified patent and that said Letters Patent is hereby corrected as shown below:

In the Claims

In column 4, line 21, in Claim 1, delete "aim" and insert -- arm --, therefor.

Signed and Sealed this
Nineteenth Day of November, 2013

Teresa Stanek Rea
*Deputy Director of the United States Patent and Trademark Office*